US011268166B2

(12) United States Patent
Foroni et al.

(10) Patent No.: US 11,268,166 B2
(45) Date of Patent: Mar. 8, 2022

(54) PROCESSES FOR PRODUCING SUPERALLOYS AND SUPERALLOYS OBTAINED BY THE PROCESSES

(71) Applicant: Foroni S.p.A., Gorla Minore (IT)

(72) Inventors: Andrea Foroni, Gorla Minore (IT); Luca Foroni, Gorla Minore (IT)

(73) Assignee: FORONI S.P.A., Gorla Minore (IT)

( * ) Notice: Subject to any disclaimer, the term of this patent is extended or adjusted under 35 U.S.C. 154(b) by 98 days.

(21) Appl. No.: 16/608,470

(22) PCT Filed: Jan. 24, 2019

(86) PCT No.: PCT/IB2019/050602
§ 371 (c)(1),
(2) Date: Oct. 25, 2019

(87) PCT Pub. No.: WO2019/202408
PCT Pub. Date: Oct. 24, 2019

(65) Prior Publication Data
US 2020/0199711 A1    Jun. 25, 2020

(30) Foreign Application Priority Data
Apr. 16, 2018   (IT) .................. 102018000004541

(51) Int. Cl.
*B22D 1/00*   (2006.01)
*B22D 7/00*   (2006.01)
(Continued)

(52) U.S. Cl.
CPC ............... *C22C 1/023* (2013.01); *C21D 9/70* (2013.01); *C22B 9/20* (2013.01); *C22C 1/1036* (2013.01); *C22C 33/04* (2013.01)

(58) Field of Classification Search
CPC .... B22D 1/00; B22D 7/00; C21D 9/70; C22B 9/003; C22B 9/04; C22B 9/05;
(Continued)

(56) References Cited

U.S. PATENT DOCUMENTS

2002/0170386 A1   11/2002   Bond et al.

FOREIGN PATENT DOCUMENTS

DE      102015016729 B4     6/2017
EP          0327042 A1       8/1989
WO     WO 2017/207414 A1 *  12/2017  ............. C21D 6/004

OTHER PUBLICATIONS

Schlatter, R., "Melting and Refining Technology of High-Temperature Steels and Superalloys: A Review of Recent Process Developments", International Conference on Superalloys-Processing, Jan. 1, 1972, pp. A1-A40.

(Continued)

*Primary Examiner* — Kevin P Kerns
(74) *Attorney, Agent, or Firm* — MH2 Technology Law Group LLP

(57) ABSTRACT

A method of producing a metal superalloy may include: providing a charge of metal materials; melting the charge of metal materials in an electric-arc furnace to obtain a first melt of the charge of metal materials; performing Argon Oxygen Decarburization (A.O.D.) treatment on the first melt to obtain a decarburized and refined first melt; solidifying the decarburized and refined first melt to obtain first ingots; melting the first ingots in a Vacuum Induction Degassing and Pouring (V.I.D.P.) furnace to obtain a second melt; solidifying the second melt to obtain second ingots; melting the second ingots in a Vacuum Arc Remelting (V.A.R.) furnace to obtain a third melt; and solidifying the third melt to obtain (Continued)

the metal superalloy. The charge of metal materials may have a weight greater than or equal to forty tons and less than or equal to sixty tons.

11 Claims, 1 Drawing Sheet

(51) Int. Cl.
| | |
|---|---|
| *C21D 9/70* | (2006.01) |
| *C22B 9/20* | (2006.01) |
| *C22B 9/04* | (2006.01) |
| *C22B 9/05* | (2006.01) |
| *C22C 1/02* | (2006.01) |
| *C22C 1/10* | (2006.01) |
| *C22C 33/04* | (2006.01) |

(58) Field of Classification Search
CPC .. C22B 9/20; C22C 1/02; C22C 1/023; C22C 1/10; C22C 1/1036; C22C 33/04
USPC ............... 164/495; 420/590; 75/10.1, 10.14
See application file for complete search history.

(56) References Cited

OTHER PUBLICATIONS

Swiatek, Ryszard (EP Authorized Officer), International Search Report and Written Opinion of the International Searching Authority, dated Apr. 9, 2019, in corresponding International Application No. PCT/IB2019/050602, 8 pages.

* cited by examiner

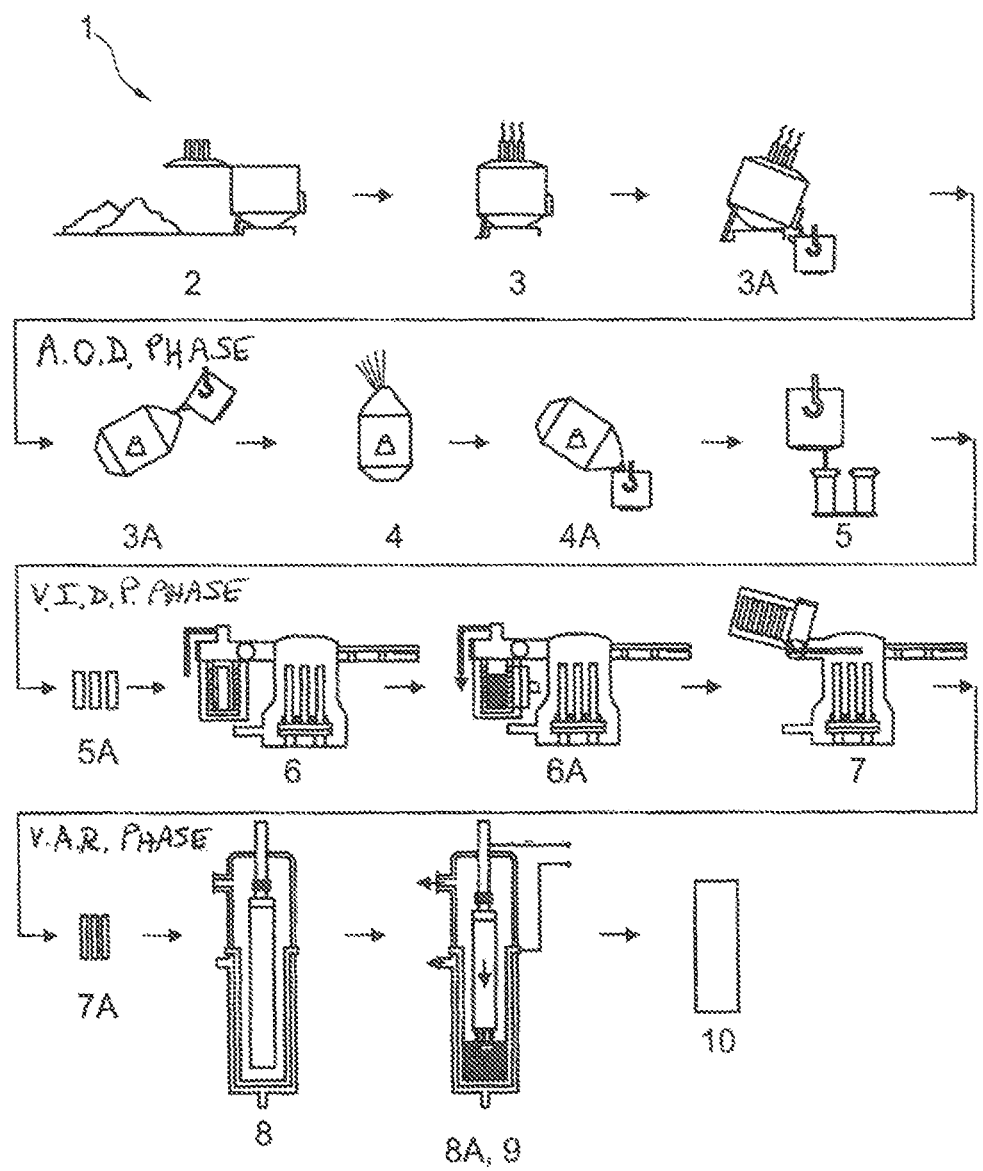

PROCESSES FOR PRODUCING SUPERALLOYS AND SUPERALLOYS OBTAINED BY THE PROCESSES

CROSS-REFERENCE TO RELATED APPLICATION(S)

This application is a national stage entry from International Application No. PCT/IB2019/050602, filed on Jan. 24, 2019, in the Receiving Office ("RO/IB") of the International Bureau of the World Intellectual Property Organization ("WIPO"), and published as International Publication No. WO 2019/202408 A1 on Oct. 24, 2019; International Application No. PCT/IB2019/050602 claims priority from Italian Patent Application No. 102018000004541, filed on Apr. 16, 2018, in the Italian Patent and Trademark Office ("IPTO"), the entire contents of all of which are incorporated herein by reference.

FIELD OF THE INVENTION

The present description relates to a method of producing metal superalloys as described in this specification.

BACKGROUND ART

The term superalloys is intended to designate materials that are able to withstand high temperatures, possibly above 1000° C., and are mainly composed of Iron and Nickel, with the addition of variable amounts of Chromium, Cobalt, Niobium, Titanium and other elements.

Superalloys are known as materials that must have a high degree of purity with respect to elements that are considered as impurities, such as, for example, Sulfur (S), Lead (Pb) and Bismuth (Bi) whose presence would jeopardize the mechanical, corrosion-resistance and thermal performances required of superalloys.

Materials having the aforementioned performances may be used for a variety of applications namely, but without limitation, in the aircraft industry, for example for the manufacture of propellers and rotor blades for turbojets.

Such materials are produced using many types of manufacturing methods including the steps of melting, cooling in suitable ingot molds, further melting and refining, for improving mechanical performances but also for reducing harmful element, namely Sulfur, Lead and Bismuth, as mentioned above.

In current methods, the production of superalloys by a "triple melt" process includes causing a charge of base materials, whose total amount by weight does not exceed twenty-five tons, to undergo a first melting step in a vacuum induction furnace, known as Vacuum Induction Melting (V.I.M.) furnace, then casting the melted material into round ingot molds from which the ingots are transferred to a second melting step, known as E.S.R. (Electro Slag Remelting) which attempts to eliminate as many impurities as possible, particularly the amount of S (Sulfur), Pb (Lead), Sn (Tin) and Bi (Bismuth). Such second melting step is followed by a third melting step, known as V.A.R. (Vacuum Arc Remelting).

Thus, this process is known to include three melts of the initial charge, with impurity removal being carried out in the second melt, known as ESR (Electro Slag Remelting).

PRIOR ART DRAWBACKS

Despite the provision of three melting steps, one of which is E.S.R., the final result of the process is the production of a superalloy in which impurities, albeit in minor amounts, are present in uneven amounts in the commercial product, as they differ between charges of materials obtained from the initial melt V.I.M., each not exceeding twenty-five tons, as is known in the art.

Also, this quantitative limit imposed on the charge does not allow the use of a much more effective purification procedure known as A.O.D. (Argon Oxygen Decarburization), which would lead to a further reduction of the impurities, because a charge amount of about twenty-five tons, as mentioned above, is insufficient to accommodate the reactions required to remove impurities such as S, Pb, Sn and Bi in the AOD procedure.

OBJECT OF THE INVENTION

The object of the present description is to provide a triple-melt method for the production of superalloys, which can provide a high degree of removal of S-, Sn-, Pb- and Bi-based impurities in the final product, as well as a high degree of evenness thereof, both in a single charge and in different charges of the material that composes the superalloy.

These and other objects, as better explained hereafter, are fulfilled by a method of producing a superalloy as described in this specification.

ADVANTAGES OF THE INVENTION

The present description can provide a method of producing a superalloy that results in a superalloy having a high homogeneity due to turbulent stirring of the liquid bath caused by gases blown during the A.O.D. process.

Furthermore, the present description can provide a method of producing a superalloy that results in a superalloy having extremely high levels of desulfurization (less than 5 ppm sulfur) and deoxidation, minimization of impurities (Bi and Se are volatilized and reduced to levels of less than 1 ppm), and high inclusion cleanness.

Also, the present description can provide strict control and high reproducibility of the chemical composition in the method of producing a superalloy due to the stoichiometry of the reactions involved.

Finally, the present invention can provide a method of producing a superalloy having a highly stable remelting rate and minimized gas, inclusions and segregation.

BRIEF DESCRIPTION OF THE FIGURES

Further features and advantages of the present description will appear more clearly from the illustrative, non-limiting description of a preferred, non-exclusive embodiment of a method of producing superalloys, as well as superalloys obtained with the method as shown in the accompanying FIG. 1, which shows a flowchart of the production of a superalloy according to the present invention.

DETAILED DESCRIPTION

Even when this is not expressly stated, the individual features as described with reference to the particular embodiments shall be intended as auxiliary to and/or interchangeable with other features described with reference to other exemplary embodiments.

Referring to the accompanying FIGURE, numeral 1 designates the method of producing a metal superalloy 10, i.e.

a metal alloy that is mainly composed of Iron and Nickel with the addition of variable amounts of Chromium, Cobalt, Titanium and other elements.

In particular, the method 1 is a triple-melt method including, as further explained below, a triple-melt process for melting and remelting a charge of base material 2.

The method 1 comprises a first step 3 in which the aforementioned charge of materials 2 is provided in an amount ranging from forty to sixty tons, preferably of fifty tons.

This first step 3 includes melting the aforementioned charge of materials in an electric-arc furnace to obtain a first melt 3A.

The electric-arc furnace is a conventional furnace and will not be further described.

Once the first melt 3A of the entire charge of materials 2 has been obtained by means of the electric-arc furnace 3, the same melt, in a liquid state, undergoes an A.O.D. (Argon Oxygen Decarburization) treatment 4, which is known in the art and will not be further described.

In other words, the first melt 3A molten by the electric furnace 3 undergoes the A.O.D. treatment 4 to obtain a refined first melt 4A.

According to an advantageous aspect of the present method, the treatment A.O.D. treatment 4 is carried out on the first melt 3A when the first melt 3A is still in the liquid state.

Namely, the A.O.D. treatment 4 can provide a decarburized and refined melt 4A with minimized impurities such as S, Pb and Sn and extremely high deoxidation.

It shall be noted that the first melt 4A has the same amount as the charge of materials 2 introduced into the electric furnace 3, that is if the charge of materials 2 is fifty tons then also the first melt 4A. will be fifty tons.

During the A.O.D. treatment 4, the liquid mass of the first melt 3A is subjected to vigorous stirring due to gases (argon, nitrogen and oxygen in varying proportions depending on the stage of the A.O.D. treatment) blown during treatment, which imparts high homogeneity to the first melt 4A.

The A.O.D. treatment 4 is followed by a step of solidification 5 of the first melt 4A.

In one aspect the solidification step 5 comprises a step in which the melt is cast into ingot molds and later cooled to obtain ingots 5A, preferably having a cylindrical shape.

Then, the ingots 5A undergo melting in a V.I.D.P. (Vacuum Induction Degassing and Pouring) furnace 6 to obtain a second melt 6A.

At the end of the treatment in the V.I.D.P furnace 6, the second melt 6A undergoes a step of solidification 7, still in the V.I.D.P furnace.

In one aspect the solidification step 7 comprises a step in which the melt is cast into ingot molds and later cooled to obtain ingots 7A, preferably having a cylindrical shape.

The ingots 7A as obtained from the solidification step 7 undergo melting in a V.A.R. (Vacuum Arc Remelting) furnace 8 to obtain a third melt 8A.

Once melting in the V.A.R. furnace 8 is completed, the third melt 8A undergoes a step of solidification 9 in the V.A.R. furnace to obtain the metal superalloy 10.

The superalloy 10 obtained by the triple-melt 4, 6 and 8 later undergoes homogenization, thermomechanical processing and thermal treatment in prior art plants and with prior art equipment.

Namely, after the solidification step 9, the superalloy 10 undergoes thermomechanical processing, which comprises a press forging step, preferably with a hydraulic press.

If a thickness of less than 250-300 mm is desired, after the solidification step and the press forging step, the superalloy 10 undergoes additional thermomechanical processing which comprises a radial four-die forging step using a hydraulic RUMX machine, and a continuous radial deformation forging step in a rolling plant, preferably of hydraulic type.

This superalloy 10 has a high chemical homogeneity and uniform mechanical, thermal and corrosion-resistance properties, as required for their use.

The superalloy 10 obtained with the method 1 is found to have high chemical homogeneity, a very high degree of desulfurization with less than 5 ppm residual sulfur, an equally high degree of deoxidation and Bi and Se impurity levels of less than 1 ppm.

This is believed to result from the fact that the initial charge 2 ranging from forty to sixty tons establishes the chemico-physical conditions required for an effective A.O.D. Treatment 4, leading to a high impurity elimination degree. In addition, the A.O.D. treatment after the first melt 3A is carried out with a high turbulence of the molten mass generated by blowing process gases, which results in a high homogeneity of chemical process reactions, and hence of the chemical composition of the molten alloy.

According to a variant embodiment of the method of the invention, the charge that leaves the A.O.D. treatment 4, for the subsequent V.I.D.P. and V.A.R. melting steps 6, 8, may be divided into multiple portions depending on the required supply of the alloy 10, thereby ensuring highly homogeneous supplies of the material even after some time.

Those skilled in the art will obviously appreciate that a number of changes and variants as described above may be made to fulfill particular requirements, without departure from the scope of the invention, as defined in the following claims.

The invention claimed is:

1. A method of producing a metal superalloy, the method comprising:
    providing a charge of metal materials;
    melting the charge of metal materials in an electric-arc furnace to obtain a first melt of the charge of metal materials;
    performing Argon Oxygen Decarburization (A.O.D.) treatment on the first melt to obtain a decarburized and refined first melt;
    solidifying the decarburized and refined first melt to obtain first ingots;
    melting the first ingots in a Vacuum Induction Degassing and Pouring (V.I.D.P.) furnace to obtain a second melt;
    solidifying the second melt to obtain second ingots;
    melting the second ingots in a Vacuum Arc Remelting (V.A.R.) furnace to obtain a third melt; and
    solidifying the third melt to obtain the metal superalloy;
    wherein the charge of metal materials has a weight greater than or equal to forty tons and less than or equal to sixty tons, and
    wherein the decarburized and refined first melt is obtained by performing the A.O.D. treatment on the first melt while the first melt is in a molten state as a result of the melting of the charge of metal materials in the electric-arc furnace.

2. The method of claim 1, wherein the melted first ingots in the V.I.D.P. furnace have a weight greater than or equal to ten tons and less than or equal to twenty tons.

3. The method of claim 1, wherein the solidifying of the second melt to obtain the second ingots comprises casting the second melt into molds.

4. The method of claim 1, wherein the solidifying of the decarburized and refined first melt to obtain the first ingots comprises cooling the decarburized and refined first melt after casting the decarburized and refined first melt into first ingot molds, and
wherein the solidifying of the second melt to obtain the second ingots comprises cooling the second melt after casting the second melt into second ingot molds.

5. The method of claim 4, wherein the first ingot molds have a shape such that the first ingots have a cylindrical shape, and
wherein the second ingot molds have a shape such that the second ingots have the cylindrical shape.

6. The method of claim 1, wherein the metal superalloy is an iron-based or nickel-based alloy that comprises variable amounts of Chromium, Cobalt, Niobium, Titanium, and/or other elements.

7. The method of claim 1, wherein after solidifying the third melt to obtain the metal superalloy, the metal superalloy undergoes thermomechanical processing that comprises press forging.

8. The method of claim 7, wherein after solidifying the third melt to obtain the metal superalloy and the thermomechanical processing that comprises the press forging, the metal superalloy, when thicknesses of less than 250-300 millimeters (mm) are required, undergoes further thermomechanical processing comprising:
radial four-die forging using a hydraulic RUMX machine; and
continuous radial deformation forging in a rolling plant.

9. The method of claim 1, wherein the metal superalloy has less than 5 parts per million (ppm) of Sulfur.

10. The method of claim 1, wherein the metal superalloy has less than 1 part per million (ppm) of Bismuth.

11. The method of claim 1, wherein the metal superalloy has less than 1 part per million (ppm) of Selenium.

* * * * *